(12) United States Patent
Longhurst et al.

(10) Patent No.: US 7,653,213 B2
(45) Date of Patent: Jan. 26, 2010

(54) EYE TRACKING SYSTEM AND METHOD

(75) Inventors: Gavin Longhurst, Cook (AU); Sebastian Rougeaux, Turner (AU)

(73) Assignee: Seeing Machines Pty Ltd (AU)

( * ) Notice: Subject to any disclaimer, the term of this patent is extended or adjusted under 35 U.S.C. 154(b) by 340 days.

(21) Appl. No.: 11/241,669

(22) Filed: Sep. 30, 2005

(65) Prior Publication Data

US 2006/0146046 A1 Jul. 6, 2006

Related U.S. Application Data

(63) Continuation of application No. PCT/AU2004/000413, filed on Mar. 31, 2004.

(30) Foreign Application Priority Data

Mar. 31, 2003 (AU) .............................. 2003901528

(51) Int. Cl.
*G06K 9/00* (2006.01)
*G06F 17/00* (2006.01)
*H04N 5/225* (2006.01)
(52) U.S. Cl. .................... 382/103; 345/418; 348/169
(58) Field of Classification Search .............. 382/103, 382/107, 117, 118, 149, 236; 348/169, 170, 348/171, 172, 208.14, 208.1, 579; 351/208, 351/209, 210, 246, 231; 345/418
See application file for complete search history.

(56) References Cited

U.S. PATENT DOCUMENTS 5,771,066 A * 6/1998 Barnea ......................... 348/59
5,912,721 A * 6/1999 Yamaguchi et al. ......... 351/210
5,978,143 A * 11/1999 Spruck ........................ 359/619
6,404,900 B1 * 6/2002 Qian et al. ................... 382/103
6,459,446 B1 * 10/2002 Harman ........................ 348/51
6,674,877 B1 * 1/2004 Jojic et al. ................... 382/103
7,127,081 B1 * 10/2006 Erdem ........................ 382/103

FOREIGN PATENT DOCUMENTS

| EP | 1 154 655 | 11/2001 |
|---|---|---|
| GB | 2 324 428 | 10/1998 |
| WO | 97/20244 | 6/1997 |
| WO | 02/41128 | 5/2002 |
| WO | 02/054132 | 7/2002 |

OTHER PUBLICATIONS

PCT International Search Report, 3 pages, Jun. 17, 2004.

* cited by examiner

*Primary Examiner*—Abolfazl Tabatabai
(74) *Attorney, Agent, or Firm*—St. Onge Steward Johnston & Reens LLC

(57) ABSTRACT

A method of tracking an expected location of a head in a computerized headtracking environment having a delayed processing requirement for locating a current head position, the method comprising the step of: utilizing previously tracked positions to estimate a likely future tracked position; outputting the likely future tracked position as the expected location of the head. Kalman filtering of the previously tracked positions can be utilized in estimating the likely future tracked position.

11 Claims, 4 Drawing Sheets

EYE TRACKING SYSTEM AND METHOD

This application is a continuation of pending International Patent Application No. PCT/AU2004/000413 filed on Mar. 31, 2004 which designates the United States and claims priority of Australian Patent Application No. 2003901528 filed on Mar. 31, 2003.

FIELD OF THE INVENTION

The present invention relates to a system for accurate prediction of a current eye location and, in particular, discloses a system for head prediction suitable for utilisation in stereoscopic displays.

BACKGROUND OF THE INVENTION

Auto-stereoscopic displays give the observer the visual impression of depth, and are therefore specifically useful for applications in the CAD area, but also have applications in 3D gaming and motion picture entertainment. The impression of depth is achieved by providing the two eyes of the observer with different images which correspond to the view from the respective eye onto the virtual scene. For background information on Autostereoscopic Displays, reference is made to: "Autostereoscopic Displays and Computer Graphics", by Halle in Computer Graphics, ACM SIGGRAPH, 31(2), May 1997, pp58-62.

Passive auto-stereoscopic displays require the observer to hold their head in a specified position, the sweet spot, where the eyes can observe the correct images. Such systems require the user to keep their head in this specified position during the whole experience and therefore have low market acceptance. When looked at from a position other than the sweet spot, the image looses the impression of depth and becomes inconsistent, resulting in eye strain as the brain attempts to make sense of the images it perceives. This eye strain can generate a feeling of discomfort very quickly which encumbers the market acceptance even more.

Active auto-stereoscopic displays in addition contain a device to track the position of the head and the eyes, typically a camera coupled with IR LED illumination, but other methods such as magnetic or capacitive methods are feasible. Once the position of the eyes relative to the display is known, the display is adjusted to project the two image streams to the respective eye locations. This adjustment can be achieved either by a mechanical device that operates a physical mask which is placed in front of the display or by a liquid crystal mask that blocks the view to the display from certain directions but allows the view from other directions, i.e. the current position of the eyes. Such displays allow the users head to be in a convenient volume in front of the auto-stereoscopic display while the impression of depth is maintained.

Although active auto-stereoscopic displays are much more practicable than passive displays, it has been found that such displays can suffer from the lag introduced by the head tracking system. When moving the head, the time between the actual head motion and the adjustment of the display to the new head position causes an offset sufficiently large to break the impression of depth and the consistency of the images with the previously described problems. This effect is particularly visible with mechanically adjusted displays.

Often applications for active auto-stereoscopic displays specifically use the head position of the observer not only to adjust the display to maintain the impression of depth but also to change the viewpoint of the scene. Such systems actively encourage the observer to move their head to get a view of the scene from different directions. In such applications visual consistency breakdowns during every head motion reduces the usability.

SUMMARY OF THE INVENTION

It is an object of the present invention to provide for a system for real time eye position prediction.

In accordance with a first aspect of the present invention, there is provided a method of tracking an expected location of a head in a computerized headtracking environment having a delayed processing requirement for locating a current head position, the method comprising the step of: utilizing previously tracked positions to estimate a likely future tracked position; outputting the likely future tracked position as the expected location of the head.

Preferably, Kalman filtering of the previously tracked positions can be utilized in estimating the likely future tracked position. The likely future tracked position can be utilized to control an auto-stereoscopic display for the display of images for eyes located at expected positions corresponding to the likely future tracked position.

In accordance with a further aspect of the present invention, there is provided a system for providing an expected location of a head the system comprising: video input means for providing at least one video signal of the head; first processing means for processing the video signal so as to output a substantially continuous series of current head location data; second processing means for processing predetermined one of the current head location data so as to output a predicted future expected location output of the head. The video input means preferably can include stereo video inputs. The second processing means can utilize a Kalman filtering of the current head location data. The system can be interconnected to an auto-stereoscopic display driven by the predicted expected location output of the head.

In accordance with a further aspect of the present invention, there is provided in a camera based face tracking system, a method of predicting the future position of a face, the method comprising the steps of: (a) providing a current prediction of the face position using facial features detected in a previous and current input image frame; (b) deriving a first covariance matrix from the current prediction and a previous covariance matrix; (c) utilizing the current prediction of the face position from step (a) and a Kalman filter to determine a corresponding projected point of the facial feature on the plane of at least one camera; (d) deriving a Jacobain of the projected points in the step (c); (e) deriving a residual covariance of the projected points in the step (c); (f) deriving a suitable filter gain for the Kalman filter; (g) deriving a suitable update coefficients for the first covariance matrix; (h) updating the Kalman filter utilizing the filter gain;

The face tracking system preferably can include multiple cameras observing a user and the steps (a) to (h) are preferably carried out for substantially each camera. Further, the method can also include the step of: (i) determining a corresponding expected eye position from the current state of the Kalman filter.

A noise component can be added to the first covariance matrix. The noise component preferably can include a translational noise component and a rotational noise component.

Further, the residual covariance of the step (e) can be utilized to tune response of the Kalman filter.

BRIEF DESCRIPTION OF THE DRAWINGS

Preferred forms of the present invention will now be described by way of example only, with reference to the accompanying drawings in which.

DESCRIPTION OF PREFERRED AND OTHER EMBODIMENTS

In the preferred embodiment, there is provided a method for reducing the adjustment lag of auto-stereoscopic displays to thereby improve their usability. Ideally, the method includes the utilisation of a prediction filter that is optimal for the requirements of auto-stereoscopic displays although other methods are possible.

Figure 1:
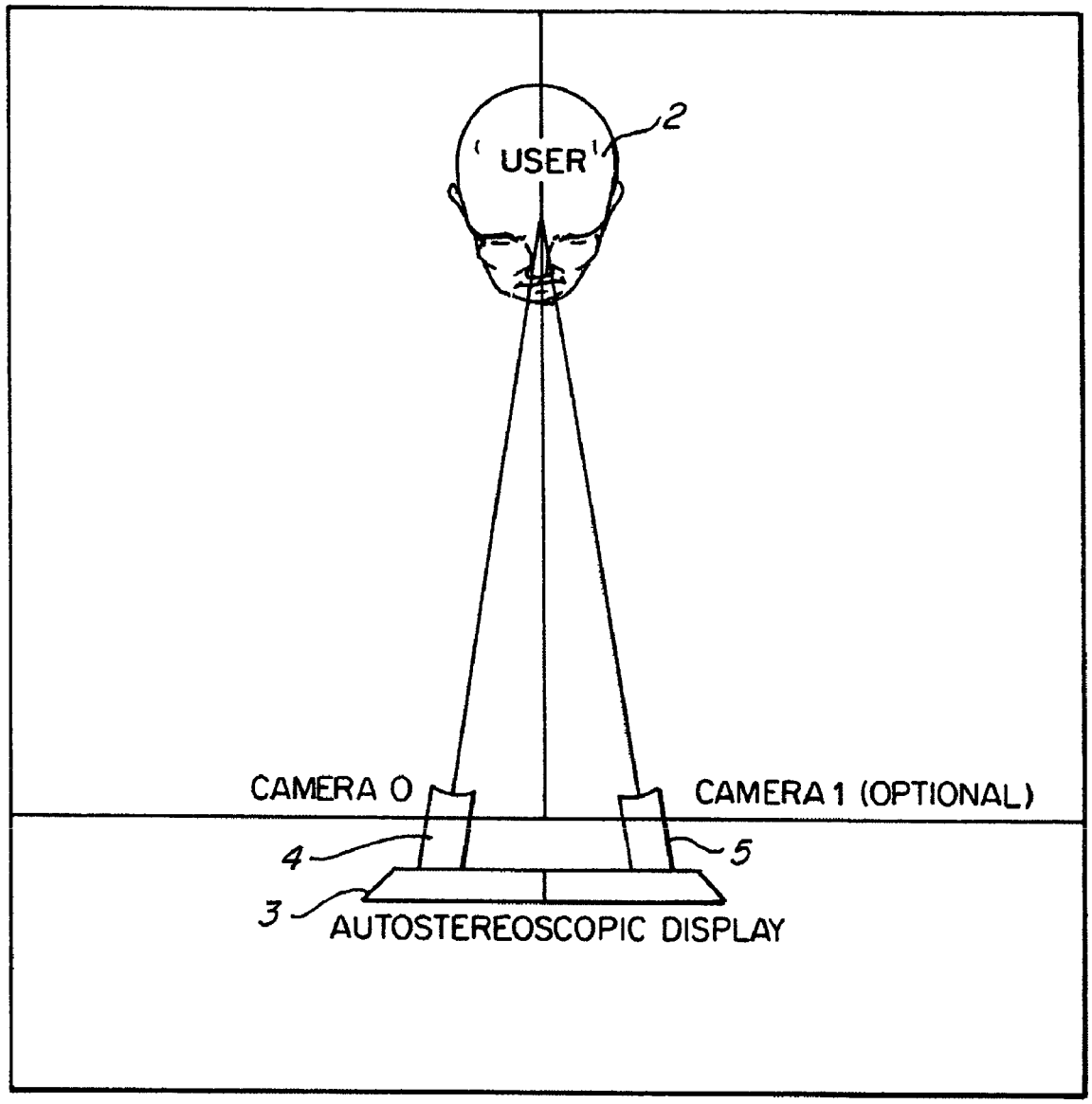
FIG. 1 illustrates schematically a top view of a user using an autostereoscopic display in accordance with the preferred embodiment.
Figure 2:
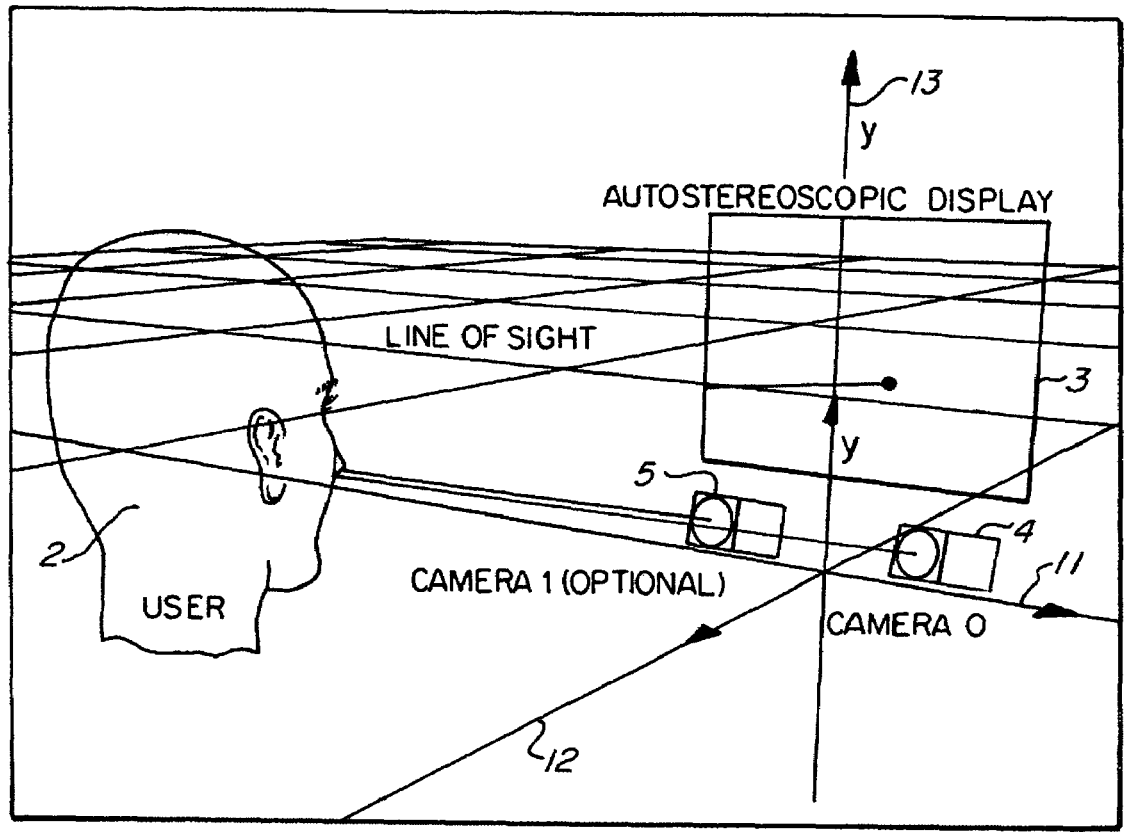
FIG. 2 illustrates schematically a side view of a user using an autostereoscopic display in accordance with the preferred embodiment.

Turning initially to FIG. 1 and FIG. 2, there is illustrated schematically an arrangement of a system for use with the preferred embodiment wherein a user 2 is located in front of an automatic stereoscopic display 3. Two cameras 4, 5 monitor the user and their video feeds are processed to derive a current facial position. The cameras 4, 5 are interconnected to a computer system implementing facial tracking techniques.

Figure 3:
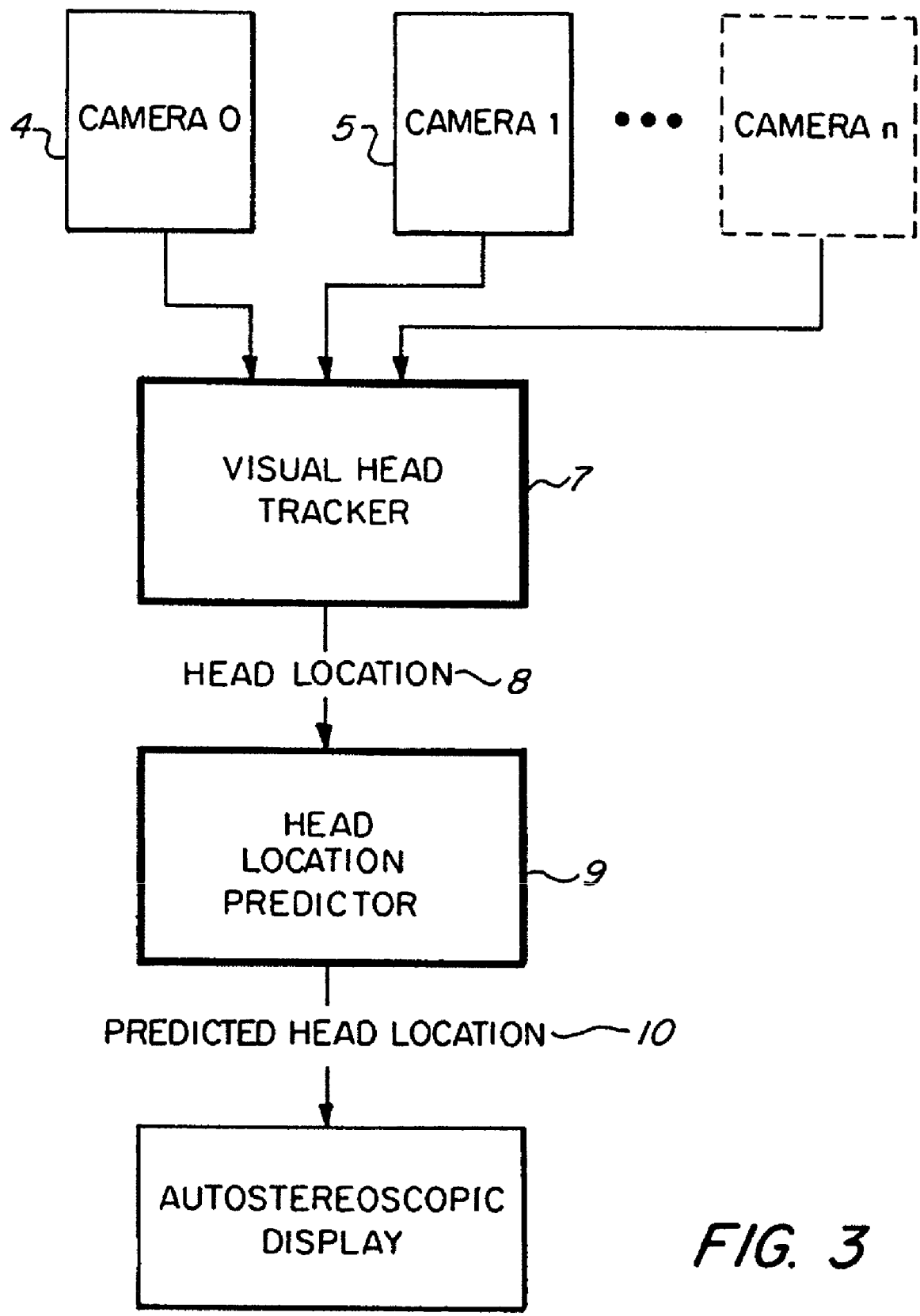
FIG. 3 illustrates the processing chain of the system of the preferred embodiment.

FIG. 3 illustrates schematically the subsequent operation of processing chain incorporating the preferred embodiment. The camera feeds e.g. 4,5, are fed to a visual head tracker 7 which tracks a current position of the user's head. The head tracker 7 can be one of many standard types available on the market. The system utilized in the preferred embodiment was that disclosed in International PCT patent application No. PCT/AU01/00249 entitled "Facial Image Processing System" assigned to the present applicant, the contents of which are incorporated herewith. The face tracking system 7 takes an input from the two cameras and derives a current face location 8. The face location is ideally derived in real time. Subsequently, a face location predictor 9 is implemented which takes the face location 8 and outputs a predicted face location 10. This is then fed to the Autostereoscopic display device 3 for use in outputting images to the user.

The functionality of the head location predictor 9 is to predict the position of the eyes of a person looking at the autostereoscopic display in a coordinate system fixed relative to the display. The eye position information is used in turn by the autostereoscopic display to produce different images when seen by the left and right eye of the user and thus create the illusion of depth.

Notation

The index i∈[0,n] is used for numerating the cameras. In an example embodiment the number of cameras n=1 or n=2

The index j∈[0,m] is used for numerating facial features of a user. In initial experiments a variable number of facial features was used with a typical value m=15.

Vectors are typically noted in bold letters, while scalars are usually noted in non-bold letters. 3D vectors are usually expressed in BOLD UPPERCASE while 2D vectors are usually noted in bold lowercase.

When writing a geometric vector, the reference frame (if any) is indicated to the top left of the vector, while the facial feature index (if any) is indicated on the bottom left of the vector. Thus $_j^i p$ represents the 2D projection of the facial feature j observed by camera i in its image plane referential. $_j^i P$ represents the 3D position of the facial feature j in the reference frame of camera i.

Camera Projective Geometry

Figure 4:
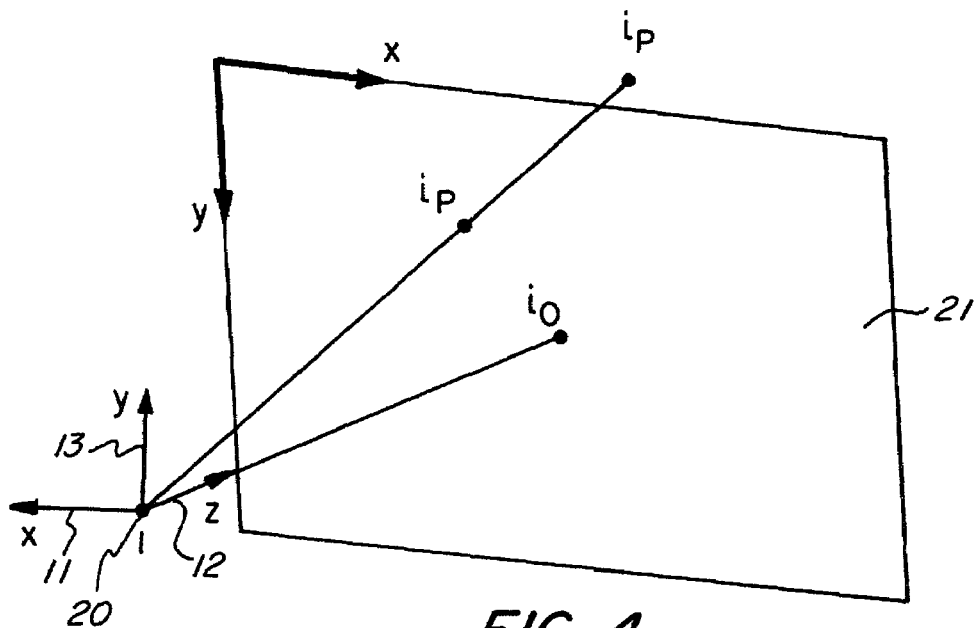
FIG. 4 illustrates the relationship between user space and image space.

A pinhole camera model is used for the projection of 3D Points onto the camera image plane. The model for projection is shown in FIG. 4. A point (20) $^iP=(^iP_x, {}^iP_y, {}^iP_z)^T$ in the reference frame of camera i∈[0,n] projects onto the image plane (21) at a point $^i p=(^i p_x, {}^i p_y)^T$ in the image plane reference frame of camera i∈[0,n] following the equations $$^i p = {}^i o + \begin{pmatrix} {}^i f_x \frac{{}^i P_x}{{}^i P_z} \\ {}^i f_y \frac{{}^i P_y}{{}^i P_z} \end{pmatrix} \qquad \text{Equation 1}$$

where $^i o=(^i o_x, {}^i o_y)^T$ is the principal point and $^i f=(^i f_x, {}^i f_y)^T$ is the focal length of camera i∈[0,n]. In initial experiments, the image size is 640×480 pixels, the principal point is near the center of the image and the focal length is typically around 1800 pixels.

Reference Frames

System Reference Frame

The system reference frame S is fixed relative to the camera (s) and the autostereoscopic display and is shown in FIG. 2 and FIG. 4 with its x-axis 11 horizontal, the y-axis 13 pointing up and the z-axis 12 pointing toward a user.

A point $^iP$ expressed in the camera reference frame i is related to a point $^SP$ expressed in the system reference frame S with the equation $$^iP = {}_S^i R \, {}^S P + {}^i T_S \qquad \text{Equation 2}$$

Head Reference Frame

Figure 5:
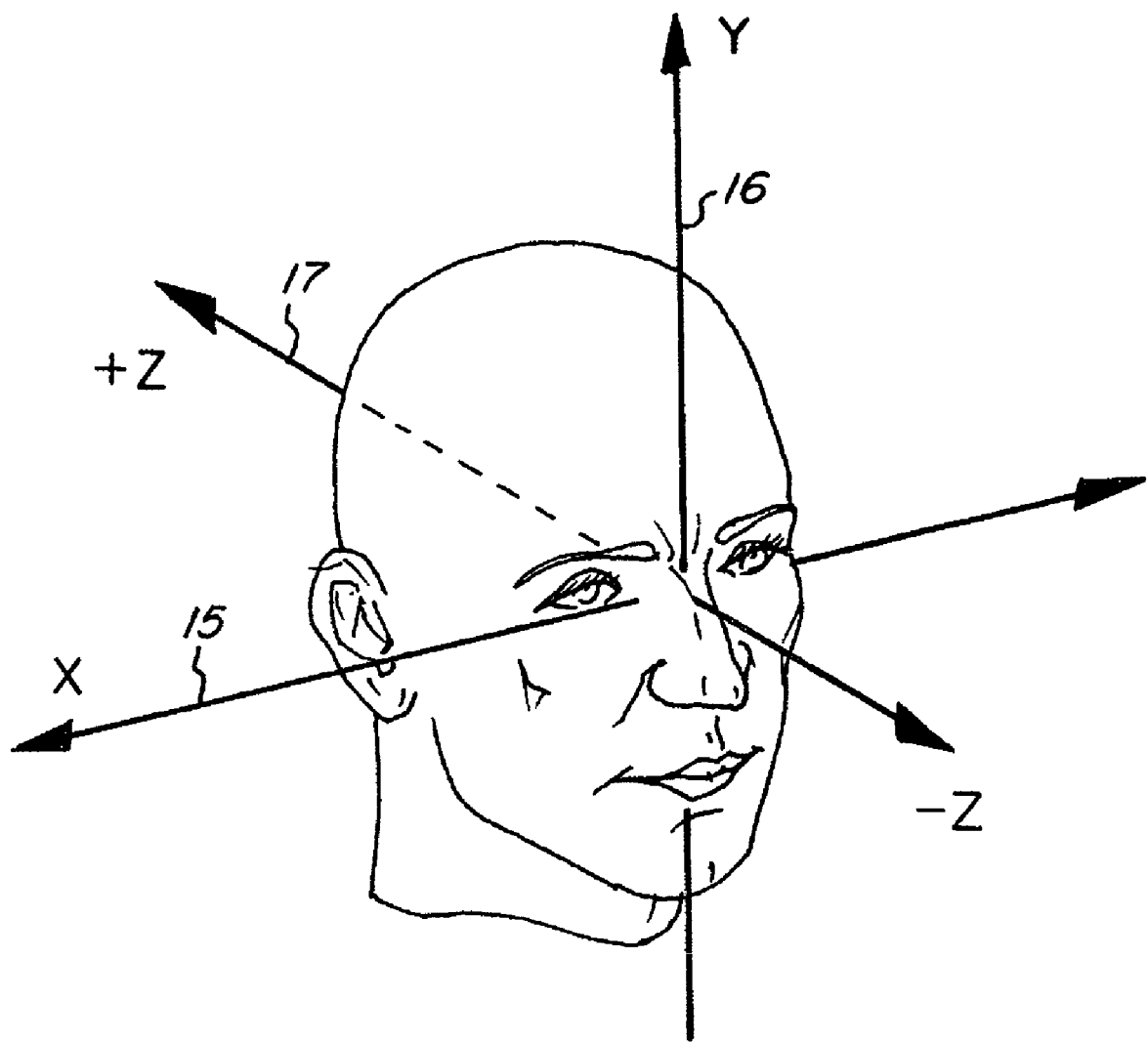
FIG. 5 illustrates the head reference frame which is fixed relative to a head.

The head reference frame H is fixed relative to the head being tracked as shown in FIG. 5. The origin of the head reference frame is placed at the midpoint of the eyeball centers of the left and right eyes, with the x axis 15 aligned on the eyeball centers, the y axis 16 pointing up and the z axis 17 pointing toward the back of the head.

A point $^HP$ expressed in the head reference frame H is related to a point $^SP$ expressed in the system reference frame S with the equation:

$$^SP = {}_H^S R \, {}^H P + {}^S T_H \qquad \text{Equation 3}$$

Head Pose

The head pose is defined as the head translation and rotation expressed in the system reference frame and is described by the rotation matrix $_H^S R$ and the translation vector $^S T_H$ The head pose rotation $_H^S R$ is stored using a vector of Euler angles $e=(e_x, e_y, e_z)^T$. If $c_x = \cos(e_x)$, $s_x = \sin(e_x)$, . . . then:

$$_H^S R = \begin{pmatrix} 1 & 0 & 0 \\ 0 & c_x & -s_x \\ 0 & s_x & c_x \end{pmatrix} \begin{pmatrix} c_y & 0 & s_y \\ 0 & 1 & 0 \\ -s_y & 0 & c_y \end{pmatrix} \begin{pmatrix} c_z & -s_z & 0 \\ s_z & c_z & 0 \\ 0 & 0 & 1 \end{pmatrix} \qquad \text{Equation 4}$$

$$= \begin{pmatrix} c_y c_z & -c_y s_z & s_y \\ s_x s_y c_z + c_x s_z & c_x c_z - s_x s_y c_z & -s_x c_y \\ s_x s_z - c_x s_y c_z & c_x s_y s_z + s_x c_z & c_x c_y \end{pmatrix}$$

Head Model

The head model is a collection of 3D point $_j^H M$, $j \in [0,m]$ expressed in the head reference frame. Each point represents a facial feature being tracked on the face.

Eye Position in the Head Model

The center of the eyeballs in the head model are noted $_j^H E$, $j=0,1$. The right eyeball center is noted $_0^H E$ and the left eyeball center is noted $_1^H E$.

Head Pose Estimation Using Extended Kalman Filtering (EKF)

State of the Kalman Filter

Given $$^S T_H = (t_x, t_y, t_z)^T, \frac{d}{dt} {}^S T_H = (\dot{t}_x, \dot{t}_y, \dot{t}_z)^T$$

and $$\frac{d}{dt} e = (\dot{e}_x, \dot{e}_y, \dot{e}_z)^T,$$

the state of the Extended Kalman Filter is selected as the position (rotation and translation) and the corresponding velocity of the head expressed in the system reference frame.

$$x = (e_x, e_y, e_z, t_x, t_y, t_z, \dot{e}_x, \dot{e}_y, \dot{e}_z, \dot{t}_x, \dot{t}_y, \dot{t}_z)^T \quad \text{Equation 5}$$

Dynamics of the Head Motion

The position of the eyes in the system reference frame is predicted by modeling the motion of the head with a set of constant dynamics. In the example embodiment, a constant velocity model is used with the noise being modeled as a piecewise constant acceleration between each measurement. (Similar techniques are outlined in Yaakov Bar-Shalom, Xiao-Rong Li: Estimation and Tracking, Principles, Techniques, and Software, Artech House, 1993, ISBN 0-89006-643-4, at page 267).

$$x_{k+1|k} = F x_k + \Gamma v_k \quad \text{Equation 6}$$

The transition matrix $F_{k+1}$ is:

$$F_{k+1} = \begin{pmatrix} I_{6 \times 6} & I_{6 \times 6} T \\ 0 & I_{6 \times 6} \end{pmatrix} \quad \text{Equation 7}$$

where $I_{6 \times 6}$ is the 6×6 identity matrix and T is the sample time, typically 16.66 ms for a 60 Hz measurement frequency.

$\Gamma$ is the gain multiplying the process noise, with a value fixed at $$\Gamma = \begin{pmatrix} I_{6 \times 1} \frac{T^2}{2} \\ I_{6 \times 1} T \end{pmatrix} \quad \text{Equation 8}$$

where $I_{6 \times 1}$ is the 6×1 column vector fill with 1, and T is again the sample time.

Initialization of the Kalman Filter when Face is Found:

Upon detecting the face, the state is set to the estimated head pose obtained from an initial face searching algorithm. Many different example algorithms can be used for determining an initial position. In the preferred embodiment the techniques discussed in International PCT patent application No. PCT/AU01/00249 were used to provide an initial head pose estimate, with a null velocity.

The covariance matrix is empirically reset to $$P_{0|0} = \frac{1}{100} \begin{pmatrix} q_e I_{3 \times 3} & 0_{3 \times 3} & 0_{3 \times 3} & 0_{3 \times 3} \\ 0_{3 \times 3} & q_t I_{3 \times 3} & 0_{3 \times 3} & 0_{3 \times 3} \\ 0_{3 \times 3} & 0_{3 \times 3} & q_e I_{3 \times 3} & 0_{3 \times 3} \\ 0_{3 \times 3} & 0_{3 \times 3} & 0_{3 \times 3} & q_t I_{3 \times 3} \end{pmatrix} \quad \text{Equation 9}$$

Iteration of the Kalman Filter during Tracking:

1. Prediction of the State

At the beginning of the each new image frame k+1, the state is predicted according to a constant velocity model:

$$x_{k+1|k} = F x_k \quad \text{Equation 10}$$

2. Prediction of the Covariance Matrix

The covariance matrix is updated according to dynamics and process noise $$P_{k+1|k} = F P_k F^T + Q_k \quad \text{Equation 11}$$

$Q_k$ represents the process noise and is computed according to a piecewise constant white acceleration model (As for example set out in Yaakov Bar-Shalom, Xiao-Rong Li: Estimation and Tracking, Principles, Techniques, and Software, Artech House, 1993, ISBN 0-89006-643-4, at page 267).

$$Q_k = E[\Gamma v_k (\Gamma v_k)^T] \quad \text{Equation 12}$$

$$= \begin{pmatrix} I_3 \frac{T^4}{4} q_e & 0 & I_3 \frac{T^3}{2} q_e & 0 \\ 0 & I_3 \frac{T^4}{4} q_t & 0 & I_3 \frac{T^3}{2} q_t \\ I_3 \frac{T^3}{2} q_e & 0 & I_3 T^2 q_e & 0 \\ 0 & I_3 \frac{T^3}{2} q_t & 0 & I_3 T^2 q_t \end{pmatrix}$$

In the implementation, we have set the translation process noise was set: $q_e = 0.01$ m·s$^{-2}$ and the rotation process noise $q_t = 0.01$ rad·s$^{-2}$ 3. Prediction of the Image Measurements For a facial feature j observed from camera i, the expected projection $_j^i p(x_{k+1|k})$ is computed in the image plane according to the predicted state $x_{k+1|k}$ The 3D point $_j^H M$, $j \in [0,m]$ corresponding to the facial feature j is first rotated according to the state x of the Kalman filter into a point $_j^S M$ $$_j^S M(x) = {}_H^S R(x) {}_j^H M + {}^S T_H(x) \quad \text{Equation 1}$$

The point $_j^S M$ is then expressed in the reference frame of camera $i \in [0,n]$ $$_j^i M(_j^S M) = {}_S^i R _j^S M + {}^i T_S \quad \text{Equation 2}$$

The point $_j^i M$ is then projected onto the image plane of camera $i \in [0,n]$ into a point $_j^i p$ $${}_j^i p({}_j^i M) = {}^i o + \begin{pmatrix} {}^i f_x \frac{{}_j^i M_x}{{}_j^i M_z} \\ {}^i f_y \frac{{}_j^i M_y}{{}_j^i M_z} \end{pmatrix} \quad \text{Equation 3}$$

4. Computation of the Jacobian of the Measurement Process

The projection can be summarised as:

$${}_j p(x) = {}_j^i p({}_j^i M({}_j^S M(x))) \quad \text{Equation 4}$$

The Jacobian of the projection is thus $$\frac{\partial {}_j^i p(x)}{\partial x} = \frac{\partial {}_j^i p({}_j^i M)}{\partial {}_j^i M} \frac{\partial {}_j^i M({}_j^S M)}{\partial {}_j^S M} \frac{\partial {}_j^S M(x)}{\partial x} \quad \text{Equation 5}$$

with $$\frac{\partial {}_j^i p({}_j^i M)}{\partial {}_j^i M} = \begin{pmatrix} \frac{{}^i f_x}{{}_j^i M_z} & 0 & -\frac{{}^i f_x {}_j^i M_x}{({}_j^i M_z)^2} \\ 0 & \frac{{}^i f_y}{{}_j^i M_z} & -\frac{{}^i f_y {}_j^i M_y}{({}_j^i M_z)^2} \end{pmatrix} \quad \text{Equation 6}$$

$$\frac{\partial {}_j^i M({}_j^S M)}{\partial {}_j^S M} = {}_S^i R \quad \text{Equation 7}$$

$$\frac{\partial {}_j^S M(x)}{\partial x} = \begin{pmatrix} 0 & a_0 & a_1 & 1 & 0 & 0 & 0 & 0 & 0 & 0 & 0 \\ a_2 & a_3 & a_4 & 0 & 1 & 0 & 0 & 0 & 0 & 0 & 0 \\ a_5 & a_6 & a_7 & 0 & 0 & 1 & 0 & 0 & 0 & 0 & 0 \end{pmatrix}$$

$$a_0 = -s_y c_z {}_j^H M_x + s_y s_z {}_j^H M_y + c_y {}_j^H M_z \quad \text{Equation 8}$$
$$a_1 = -c_y s_z {}_j^H M_x - c_y c_z {}_j^H M_y$$
$$a_2 = (c_x s_y c_z - s_x s_z){}_j^H M_x - (c_x s_y s_z + s_x c_z){}_j^H M_y - c_x c_y {}_j^H M_z$$
$$a_3 = s_x c_y c_z {}_j^H M_x - s_x c_y s_z {}_j^H M_y + s_x s_y {}_j^H M_z$$
$$a_4 = (c_x c_z - s_x s_y s_z){}_j^H M_x - (s_x s_y c_z + c_x s_z){}_j^H M_y$$
$$a_5 = (s_x s_y c_z + c_x s_z){}_j^H M_x + (c_x c_z - s_x s_y s_z){}_j^H M_y - s_x c_y {}_j^H M_z$$
$$a_6 = -c_x c_y c_z {}_j^H M_x + c_x c_y c_z {}_j^H M_y - c_x s_y {}_j^H M_z$$
$$a_7 = (c_x s_y s_z + s_x c_z){}_j^H M_x + (c_x s_y c_z - s_x s_z){}_j^H M_y$$

5. Computation of Residual Covariance

Once the Jacobian of the projection has been computed, the residual covariance can be calculated for the measurement of feature j from camera i $${}_j^i S_{k+1} = \frac{\partial {}_j^i p(x_{k+1|k})}{\partial x_{k+1|k}} P_{k+1|k} \frac{\partial {}_j^i p(x_{k+1|k})^T}{\partial x_{k+1|k}} + {}_j^i V_{k+1} \quad \text{Equation 9}$$

where ${}_j^i V_{k+1}$ represents the measurement noise of the facial feature j observed by camera i at frame k+1. We have set empirically $${}_j^i V_{k+1} = \alpha \begin{pmatrix} \sum dx^2 & \sum dx\,dy \\ \sum dx\,dy & \sum dy^2 \end{pmatrix}^{-1} \quad \text{Equation 10}$$

where dx and dy represent the image gradient in the image patch used to locate the facial feature j observed by camera i.

The coefficient α can be used to tune the responsiveness of the filter (control the balance between the measurements and the process dynamics).

6. Computation of the Filter Gain

The filter gain can then be computed:

$${}_j^i W_{k+1} = P_{k+1|k} \frac{\partial {}_j^i p(x_{k+1|k})^T}{\partial x_{k+1|k}} {}_j^i S_{k+1}^{-1} \quad \text{Equation 11}$$

7. Update of the State Covariance $$P_{k+1|k+1} = P_{k+1|k} - {}_j^i W_{k+1} S_{k+1} {}_j^i W_{k+1}^T \quad \text{Equation 12}$$

8. Update of the State of the Kalman Filter

If we note ${}_j^i z_{k+1}$ the measurement of the projection of the facial feature j from camera i taken at frame k+1 (obtained from zero-mean normalized cross-correlation), then the state of the filter can be updated with the equation $$x_{k+1|k+1} = x_{k+1|k} + {}_j^i W_{k+1} ({}_j^i z_{k+1} - {}_j^i p(x_{k+1|k})) \quad \text{Equation 13}$$

9. Loop until all the Measurements Have Been Entered

Assign the new predicted state $x_{k+1|k} = x_{k+1|k+1}$. Return to step 0 until all the measurements from all the cameras are entered in the Kalman filter. The current implementation first loop on all the features measured by camera 0 (camera A), then loops on all the features measured by camera 1 (camera B).

When all the measurements have been entered, the last state represents the head position and velocity for the image frame k+1.

Prediction of the Eye Position

Given the current state of the Kalman filter $x(T_0)$ at time $T_0$, a prediction of the head translation and rotation at time $T_1 = T_0 + \Delta T$ can be derived from Equation 10 as $$x(T_1) = F(\Delta T) x(T_0) \quad \text{Equation 14}$$

with the transition matrix $$F(\Delta T) = \begin{pmatrix} I_{6 \times 6} & I_{6 \times 6} \Delta T \\ 0 & I_{6 \times 6} \end{pmatrix} \quad \text{Equation 15}$$

The predicted position of the eyeball center in the system reference frame at time $T_1$ can then be computed from Equation 1

$${}_j^S E(T_1) = {}_j^S E(x(T_1)) = {}_H^S R(x(T_1)) {}_j^H E + {}^S T_H(x(T_1)) \quad \text{Equation 16}$$

This completes the cycle of computation for one measurement frame and the predicted eye position ${}_j^S E(T_1)$ are forwarded to the autostereoscopic display to coincide the emitted image with the actual position of the eyes.

The foregoing describes only preferred forms of the present invention. Modifications, obvious to those skilled in the art can be made thereto without departing from the scope of the invention.

What is claimed is:

1. A face tracking system for predicting the future position of a face comprising:
   multiple cameras for observing a user, each camera carrying out the steps of:
   (a) providing a current prediction of the face position using facial features detected in a previous and current input image frame;

(b) deriving a first covariance matrix from the current prediction and a previous covariance matrix;

(c) utilizing said current prediction of the face position from step (a) and a Kalman filter to determine a corresponding projected point of the facial feature on the plane of at least one camera;

(d) deriving a Jacobian of the projected points in said step (c);

(e) deriving a residual covariance of the projected points in said step (c);

(f) deriving a suitable filter gain for said Kalman filter;

(g) deriving a suitable update coefficients for said first covariance matrix;

(h) updating said Kalman filter utilizing said filter gain.

2. The face tracking system of claim 1 further comprising each camera carrying out the step of:

(i) determining a corresponding expected eye position from the current state of the Kalman filter.

3. The face tracking system of claim 1 wherein a noise component is added to said first covariance matrix.

4. The face tracking system of claim 3 wherein said noise component includes a translational noise component and a rotational noise component.

5. The face tracking system of claim 4 wherein said residual covariance of said step (e) is utilized to tune response of the Kalman filter.

6. The face tracking system of claim 1, wherein said face tracking system further comprises an auto-stereoscopic display driven by said prediction of future position of the face.

7. A system for tracking an expected location of a head in a computerized headtracking environment having a delayed processing requirement for locating a head position, the system comprising:

a device, such that the system utilizes previously tracked positions to estimate a likely future tracked position; and outputs the likely future tracked position as the expected location of the head to said device, wherein said likely future tracked position is utilized to control an auto-stereoscopic display for the display of images for eyes located at expected positions corresponding to said likely future tracked position, and wherein Kalman filtering of the previously tracked positions is utilized in estimating said likely future tracked position.

8. The face tracking system of claim 7 wherein utilizing previously tracked positions to estimate a likely future tracked position further includes the steps of:

(a) providing the expected location of the head using facial features detected in a previous and current tracked positions;

(b) deriving a first covariance matrix from the current prediction and a previous covariance matrix;

(c) utilising the current prediction from step (a) and a Kalman filter to determine a corresponding projected point of the facial feature on the plane of at least one camera;

(d) deriving a Jacobain of the projected points from step (c);

(e) deriving a residual covariance of the projected points from step (c);

(f) deriving a suitable filter gain for the Kalman filter;

(g) deriving a suitable update coefficients for the first covariance matrix; and (h) updating the Kalman filter utilising the filter gain.

9. A system for providing an expected location of a head the system comprising:

video input means for providing at least one video signal of the head;

first processing means for processing the video signal so as to output a substantially continuous series of current head location data;

second processing means for processing predetermined one of the current head location data so as to output a predicted future expected head position as the expected location of the head, thereby substantially overcoming a delay in processing the head position, wherein said second processing means utilizes a Kalman filtering of the current head location data; and an auto-stereoscopic display driven by said predicted expected location output of said head.

10. The system of claim 9 wherein said video input means includes stereo video inputs.

11. The system of claim 9 further comprising an auto-stereoscopic display driven by said predicted expected location output of said head.

* * * * *